April 19, 1966    A. R. MORSE    3,246,367
FIXED SCREW PLASTIC INJECTION DEVICE
Filed Oct. 22, 1962
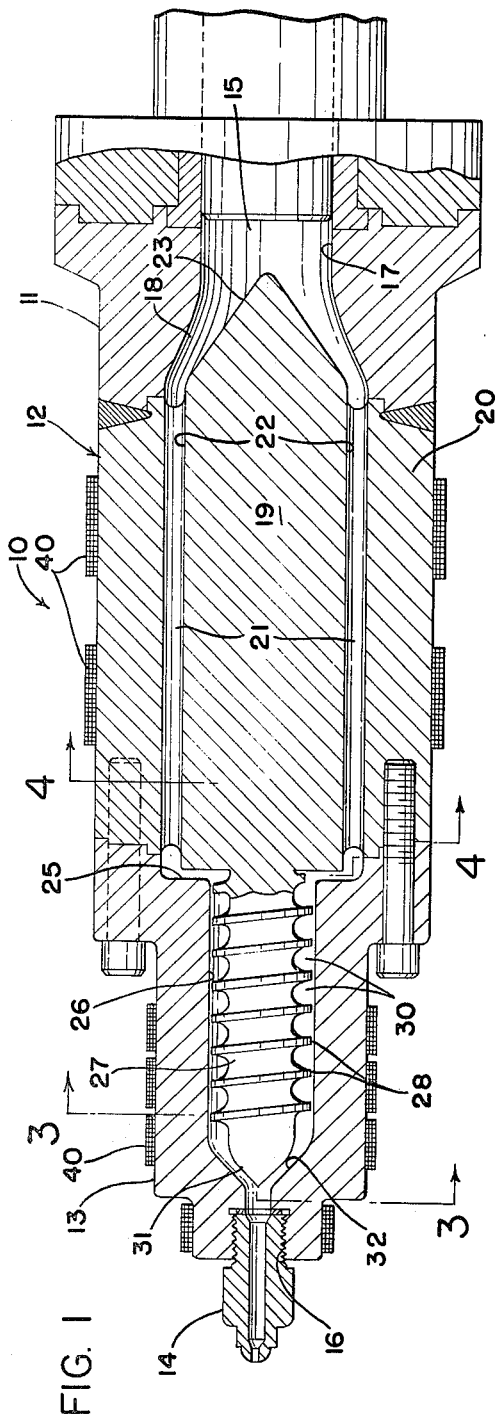
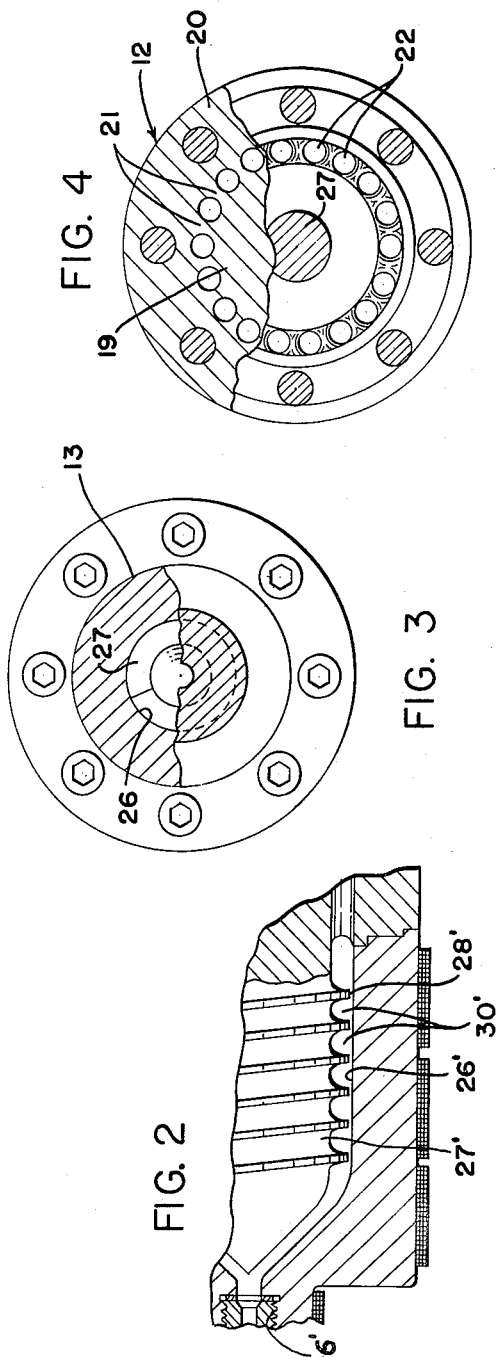
INVENTOR.
ALBERT REYNOLDS MORSE
BY
*Fay & Fay*
ATTORNEYS

United States Patent Office 3,246,367
Patented Apr. 19, 1966

3,246,367
FIXED SCREW PLASTIC INJECTION DEVICE
Albert Reynolds Morse, Cleveland, Ohio, assignor to Injection Molders Supply Co., Inc., Cleveland, Ohio, a corporation of Ohio
Filed Oct. 22, 1962, Ser. No. 232,201
1 Claim. (Cl. 18—30)

This invention concerns a plastic injection molding device having a flow passage which includes in series; a charge opening, a spreader having a plurality of discrete passages, a screw fixedly mounted on said spreader to define a helical passage, and a discharge opening having a seat for a nozzle.

The device is adapted particularly for thoroughly plasticizing, blending, and mixing plastic to be injected from a standard injection molding machine into a conventional mold. The apparatus of the invention is extremely efficient in eliminating streaking, lack of homogeneity, and resultant laminar flow patterns generally found in plastic products produced by injection molding of thermoplastic materials such as the polyolefins, styrenes, Nylons, acrylics, cellulosics, polycarbonates, vinyls, and acetals.

In a broad sense, the apparatus of the invention contemplates an injection molding device for use as a heating cylinder on conventional injection molding machines. The cylinder assembly includes an elongated housing means having a heated outer portion, a continuous flow passage which communicates a charge opening and a nozzle receiving discharge opening located at opposite ends thereof. The flow passage is provided with a generally straight conduit portion adjacent the charge, and the straight conduit portion has a first apical conduit portion adjacent thereto which separates it from a plurality of discrete conduits defined by walls in direct heat conducting relation to the heated outer portion. The discrete conduits of the flow passage have adjacent to them, on the end remote from the apical portion, a fixedly mounted screw which defines with a bore in the elongated housing means, a helical passage leading to the discharge opening and conventional injection mold nozzle connection therein.

In injection molding, using conventional apparatus, previously known heating cylinders give the plastic flowing therethrough a laminar and linear flow pattern, which appears in the molded products as objectionable color streaking and also as potential zones of fracture and strain. These defects are generally caused by the uneven and irregular heating patterns developed in the viscous plastic material as it passes laminarly through the conventional heating cylinders.

The prior art has seen innumerable variations in the design of plastifying devices and spreads because of these defects in conventionally molded products. Generally, these devices have been subject to objections because of the inherent difficulty in heating cylinder clean out when making material and color changes, obtaining even heat transfer into the plastic material, withstanding the magnitude of injection pressures required for proper molding without cracking or breaking, and manufacturing and producing the complex shapes resulting from these techniques inexpensively.

Perhaps the most efficient plastifying device of the prior art is disclosed in U.S. Patent No. 2,766,483, issued to J. C. Stokes on October 16, 1956 and dedicated to the public November 10, 1959. The Stokes plasticizer basically constitutes a solid member with a plurality of discrete passages externally heated such that an even and efficient transfer of heat to the plastic material from all sides can be accomplished with conventional injection molding machines. A disadvantage of the Stokes discrete passage type of spreader or plasticizer, however, is that spreader marks are imparted to the material which result in laminar and straight-line flow patterns with resultant zones of potential fractures and strains and nonuniform color being incorporated in the final molded product.

The purpose of the fixed screw plastic injection cylinder of the present invention is to deorient the plastic material and to break up the laminar and straight-line flow patterns found in products made by conventional injection molding machines without resorting to complex mechanical stirring devices, and without causing a back pressure or restriction which causes pressure and capacity losses or which generates undesirable i.e. uncontrollable frictional heat within the plastic material emerging from the heating cylinder of the machine. Many complicated mechanical stirrers to accomplish the purposes of the instant invention have been designed; however, they have, in the main, been exceedingly costly to make, to maintain, and to clean, and have not been readily adaptable for use on conventional machines of the type already in use in injection molding plants without destroying the usefulness of these machines for plunger molding.

The plastic injection molding device of this invention, therefore, overcomes the objections to the prior art devices in that it; (1) provides first for extremely efficient melting of dry granules in a discrete chambered spreader having melting passages which are all properly proportional for correct heat transfer into the plastic material from all sides; (2) provides for storage space ahead of the spreader where volume can easily be regulated by selection of a different size of mixing or deorienting channel so that adequate, but not excess, inventory, may be maintained near the nozzle without burning or decomposition of the material within the heating chamber; (3) provides a full mixing, mulling, and churning action for the fully plastified material in a spiral passage without requiring any longitudinal tapering or other complex machining operations on heating cylinders of standard design which are to be converted to take advantage of these features; (4) eliminates pressure losses incident to shoving, pushing, or forcing unmelted granules into spiral passages which occurs when pressure is used to force still unmelted granules into a spiral path before they are completely plasticized into a semi-liquid form capable of being benefited by laminar deorientation from churning and mixing in the helical passage; (5) eliminates the large pressure losses incident to restricted nozzle devices of various configurations which have been unsuccessfully attempted to be utilized in mixing out spreader streaks and strain marks because of the failure of these nozzle devices to erase streaks efficiently from the plastic material.

A further advantage of this invention is that it eliminates the need for a power drive to a screw as will be found in earlier attempts to provide for movement of the plastified material through a helical path by forcing it with a moving and rotating screw or spreader.

A further advantage of this invention is that it utilizes standard hydraulic power and conventional piston action to generate a rotary motion in the plastic material. In the case of conversion of older machines, no additional modifications or power sources are necessary to achieve rotary mulling and mixing of the hot plastic immediately prior to injection through the nozzle into the mold cavity.

The advantages of the present invention result because of a speeding up of the travel of the now-melted plastic after it leaves the plastifying or spreader portion of the heater and the provision of a continuous passage for smooth flow to the mold after complete melting without encountering any further obstructions, webs, legs, or other spots or restrictions where plastic streaks and laminar flow patterns are started. Accordingly, the helical path through which the fully plastified material is forced results in a full mixing out of substantially all spreader, flute, leg, and web marks and of any uneven heats which have occurred in all stationary melting devices and spreaders used heretofore on conventional machines without elaborate mechanical stirring devices.

It has been found in connection with the speeding up of the melted plastic that although the spiral passageway reduces the inventory of standard annular passages by approximately 50 percent, no decrease in plasticizing capacity results because increased velocity is imparted to the material. Great improvement in the melting of heat sensitive thermoplastics without loss of plasticizing capacities or decomposition results from the use of increased velocity through the helical passage of the present invention. This is true because in a given 8 to 10 inch length of the barrel in a conventional heating cylinder, for example, very little time or space is available for stirring of the plastified material. The tortuous helical path of the present invention in a similar unit of the same overall dimensions provides approximately 55 to 60 inches of flow length for the semi-viscous plastified material to travel while under the constant churning action imparted to it by the helical conduit. The instant invention, therefore, permits increase of plastic travel of a magnitude of seven or ten times over previous methods.

Reference is also made to U.S. Patent No. 2,977,634, issued to A. R. Morse on August 4, 1958, where a reverse flow technique allows a magnitude of increase in length of plastic travel of from three to four times without the tortuous helical path provided here; mixing and mulling do not occur and objectionable laminar flow patterns are produced despite the two right angle turns provided. Increased plastic travel alone, therefore, does not accomplish what the present helical tortuous passage now provides.

Thus, it can be stated that the provision of the fixed screw applied to semi-viscous thermoplastics where the plastic material itself is forced to turn rather than itself being turned by movable mechanical devices, or other types of screws or stirrers, constitutes a new and novel method of transforming dry thermoplastic into a fully homogeneous melt ready for molding at a minimum of investment and with a minimum of mechanical complications which have produced a chaotic state in the various attempts to screw mold to date at costs comparable with plunger type presses.

With the problems of the prior art devices in mind, it is the general object of this invention to provide a fixed screw and spreader plasticizing cylinder for use in plastic injection molding devices to deorient the plastic material and to break up the laminar and straight-line flow patterns and eliminate potential zones of strains and fractures found in products made by conventional injection molding machines.

It is a more specific object of this invention to provide a plastic injection molding device which provides extremely efficient melting of dry granular particles of plastic in a discrete chambered spreader having melting passages which are proportioned for correct heat transfer into the plastic material from all sides without the disadvantage of streaking, and lack of homogeneity and uniform temperatures normally produced by said spreaders of other designs.

It is a further object of the invention to provide a fixed plastic injection cylinder design which provides for storage space ahead of the spreader where volume of viscous plastic can easily be regulated by selection of different sizes of mixing and deorienting channels to eliminate burning or decomposition of the material within the heating chamber.

It is an additional object of the invention to provide a fixed screw plastic injection cylinder which provides a full mixing, mulling and turning action for the fully plastified material in a spiral passage which has no moving parts, is easily cleaned, and easily manufactured without the necessity for complicated machining operations incident to conventional extruder screw manufacture.

It is a further object of the invention to provide a fixed screw plastic injection cylinder which eliminates pressure losses incident to shoving, pushing, or forcing unmelted granules into spiral passages of molding devices before they are completely plasticized.

It is an additional object of the invention to provide a fixed screw plastic injection cylinder which eliminates pressure losses incident to the ineffective and restricted nozzle devices heretofore known for deorienting plastic materials to break up laminar and straight-line flow patterns found in molded products.

Other and more specific objects of the invention will be apparent from the detailed description to follow.

In the drawings:

FIG. 1 is a longitudinal cross-sectional view of a fixed screw plasticizing cylinder constructed according to the principles of the invention mounted on a conventional plastic injection molding device;

FIG. 2 is a fragmentary longitudinal cross-sectional view of an alternative embodiment of the fixed screw plasticizing cylinder of FIG. 1;

FIG. 3 is a cross-sectional view taken along the line 3—3 of FIG. 1; and

FIG. 4 is a cross-sectional view taken along the line 4—4 of FIG. 1.

In the several views of the drawing, like parts are designated by like numerals throughout.

The fixed screw plasticizing cylinder of this invention is for use with plastic injection molding machines of the conventional type and is generally designed by the numeral 10 in FIG. 1. The cylinder assembly 10, as illustrated, is made up of a clamping or conventional flange section 11, a spreader section 12, and a tortuous or helical path section 13 having a nozzle 14 mounted therein. The cylinder assembly 10 thus provided further includes an elongated continuous flow passage which communicates a charge opening 15 at the end defined by the section 11, with a discharge opening 16 at the opposite end in section 13 which is counterbored and threaded to receive the nozzle 14 in a conventional manner.

The flow passage is provided with a generally straight conduit portion 17 adjacent the charge opening 15 such that the plunger of a conventional injection molding machine may force the plastic material directly into the assembly 10 mounted thereon through opening 15 in a manner that will be well understood by those skilled in the art. Adjacent to the conduit portion 17, the flow passage in the flanged section 11 flares outwardly and defines an outwardly tapered mouth portion 18.

The spreader section 12, connected to the flange section 11 by welding or other suitable known means has a central section 19 which is integrally connected to the outer wall portion 20 of said section by means of a plurality of integral webs 21 which define a plurality of discrete axially directed passages 22 in alignment with the end of the passageway portion 18. A conical projection 23 on the end of the central portion 19 of the spreader section 12 is dimensioned such that it extends coaxially into the tapered portion 18 and is spaced inwardly therefrom to define an apical channel portion leading to the discrete passages 22 from the straight flow passage portion 17.

The basic design of the spreader section described utilizes the principles generally disclosed in the aforementioned United States Patent No. 2,766,483 to Stokes and provides for even heating and plasticizing of the plastic material from all sides, utilizing ideal proportions for efficient heat transfer to the plastic material from the outer surface of the cylinder assembly 10 to prevent overheating and decomposition along with zonal control of the plastic material flowing through the discrete passages 22, as will be readily understood by those skilled in the art.

Bolted or otherwise suitably provided on the end of the spreader section 12 in coaxial relation thereto is the heated tortuous path section 13 in which the streaking, lack of any temperature homogeneity, and resultant laminar flow patterns are removed or deoriented from the viscous plastic by the mixing and mulling action of said path. From the discrete passages 22, the now heated and viscous plastic material flows smoothly into a rather abrupt direction changing gathering ring portion 25 at the entrance to the interior of the section 13. The portion 25 defines a linking passage between a general axial bore 26 of section 13 and the discrete passages 22 of the adjacent spreader section 12.

Extending into the bore 26 is a fixed screw 27 having flights 28 of slightly smaller overall diameter than the inside diameter of the bore 26. The fixed screw 27 may be mounted by means of threads or other appropriate means in the end of the spreader central portion 19 or made integral with it as illustrated here, coaxial to the entire cylindrical assembly 10 defined by the various sections. The helical passage 30, which is defined by the flights 28 and the bore 26, connects and communicates the spreader section flow passages 22 to the discharge opening 16' and nozzle 14 mounted therein.

Accordingly, it will be seen that the entire cylindrical assembly is communicated by a continuous flow passage such that the unmelted granular plastic material enters the suitably proportioned charge opening 15, passes through the generally straight conduit portion 17 adjacent to the charge opening 15, and then continues through the apical conduit portion defined by the conical projection 23 of the central portion 19 of the spreader section 12 and the tapered surface 18 of the passageway portion in the flange section 11. The flow then continues past the apical conduit portion into the heated discrete conduits 22 defined by the walls or webs 21 which maintain the central section 19 of the spreader in direct heat conducting relation to the heated outer portion 20 thereof. The plastic material being melted is forced through the dscrete passages 22 into the gathering ring portion 25 of the deorienting section 13 into the tortuous recurring pattern passageway 30 therein which is defined by the flights 28 of the fixed screw 27 and the bore 26 of said section. From passageway 30, the material proceeds directly to the discharge opening 16 and nozzle 14.

It will thus be seen that the plastic is efficiently melted from all sides and then is churned, turned, mulled and mixed in the tortuous path, by means of its being pushed therethrough, to deorient, drag, and break up the laminar pattern which the dscrete passages 22 of any known spreader type impart thereto.

In an alternate embodiment, as illustrated in the fragmentary view of FIG. 2, it will be seen that the dimensions of the bore 26 may be enlarged relative to the spreader structure as shown at 26' such that the gathering ring 25 is effectively eliminated from the discrete passageways 22 against the first flight 28' of the screw 27' and thereby forward through the somewhat larger helical passage 30'.

In both embodiments it will be noticed that the end of the screw 31 and a tapered end portion 32 of the bore 26 define a second apical conduit section similar to that defined by the spreader projection 23 and the tapered internal surface portion 18 of the flange member of section 11. This provides the guide portion for progressing the smooth flow of the now plastified and deoriented material into the nozzle 14. It will be noted in this respect that there are no abrupt directional changes or sharp corners in the flow path from the time the viscous plastic material leaves the tortuous helical path 30 until it enters the nozzle 14 to be introduced into a conventional mold connected thereto in a manner well known in the art.

As will be readily understood in the art, throughout the length of the cylindrical housing assembly 10 and its various sections 11 through 13, electric resistance heaters are disposed in heat transferring relations to the metal structure of the device such that the plastic is continually heated during its travel through the flow passage communicating the charge opening and nozzle-receiving discharge opening.

Electrical resistance heaters of the type conventionally used in the art and, in particular, of either the powder backed or mica insulated type may be used, and the schematically illustrated heaters 40 are provided by way of illustration and not by way of limitation to the concepts here disclosed.

It should further be understood that conventional nozzle devices may be used in connection with the instant device for furthering effectiveness thereof and for adapting the device to the solution of particular problems that might arise from any given production run in a molding shop.

In further explanation of the scope of the principles of the invention described herein, it is contemplated that the reverse flow principle, as taught in the aforementioned Morse Patent No. 2,977,634, may be combined in the combination with the same results of deorientation referred to in connection with the illustrated embodiment. It will be noted in this respect that when the reverse flow principle is used, the fixed screw is merely fastened to the end section bolted onto the spreader rather than being attached to the central portion 19 of the spreader, and is of a hollow nature as will be apparent from an understanding of the reverse flow principle. It being recognized, of course, that a fixed screw plastic injection heating cylinder constructed according to the principles of this invention must have a flow passage which includes in series a charge opening, a spreader having a plurality of discrete passages, a screw fixedly mounted to define a helical passage, and a discharge opening having a seat for a mold connecting nozzle.

For ease of description the principles of the invention have been set forth with but a single illustrated embodiment showing the essential functional and structural nature of the combination. It is not my intention that the illustrated embodiment nor the terminology employed in describing it be limiting inasmuch as variations in these as well as in size and configuration may be made without departing from the spirit of the invention. Rather, I desire to be restricted only by the scope of the appended claim.

The invention claimed is:

A plastic injection molding machine comprising an elongated metal housing means with heating means in heat transferring relation to the outer surface thereof, an elongated flow passage comprising a plurality of conduit portions in fluid conducting communication with said housing means, a charge opening in fluid conducting communication with said flow passage for the introduction of thermoplastic material to said flow passage at one end thereof, a counterbored and threaded discharge opening in fluid conducting communication with said flow passage at the end of the flow passage opposite said charge opening, a nozzle threadedly received in said discharge opening, an elongated straight conduit portion in fluid conducting communication with said charge opening immediately adjacent said charge opening, a plunger mounted for reciprocation in said straight conduit portion, a first apical conduit portion converging toward said plunger in fluid conducting communication with said straight conduit portion immediately adjacent said straight conduit portion at one end thereof opposite said charge opening, a plurality of discrete conduit portions comprising walls of metal in direct heat-conducting relation to the outer surface of said metal housing means in fluid conducting communication with said first apical conduit portion immediately adjacent said first apical conduit portion at the end thereof opposite said straight conduit portion, a single flow path fixed helical conduit portion of said flow passage in fluid conducting relation with said plurality of parallel discrete conduit portions immediately adjacent said plurality of parallel discrete conduit portions at the ends thereof opposite said first apical portion, a second apical conduit portion in fluid conducting relation with said helical conduit portion immediately adjacent to said helical conduit portion at the end thereof opposite said plurality of parallel discrete conduit portions, said second apical condition portion converging toward said discharge opening immediately adjacent said discharge opening, whereby granular thermoplastic material is introduced into said charge opening and forced by reciprocating action of said plunger through said fixed flow passage conduit portions in a manner which heats and mixes the plastic uniformly and discharges it in a fluid and substantially fully mixed condition from said discharge nozzle.

References Cited by the Examiner

UNITED STATES PATENTS

| | | | |
|---|---|---|---|
| 2,766,483 | 10/1956 | Stokes | 18—30 |
| 3,110,932 | 11/1963 | Fischer | 18—30 |
| 3,156,013 | 11/1964 | Elphee | 18—30 |

FOREIGN PATENTS

| | | |
|---|---|---|
| 334,039 | 12/1958 | Switzerland. |
| 349,070 | 11/1960 | Switzerland. |

J. SPENCER OVERHOLSER, *Primary Examiner.*

ROBERT F. WHITE, WILLIAM J. STEPHENSON,
*Examiners.*